(12) United States Patent
Tokarev et al.

(10) Patent No.: US 12,471,571 B2
(45) Date of Patent: *Nov. 18, 2025

(54) SYSTEMS AND METHODS OF LIVESTOCK MANAGEMENT

(71) Applicant: SILK WAY SERVICES INC., Toronto (CA)

(72) Inventors: Denis Tokarev, Toronto (CA); Robert Girard, Whitby (CA)

(73) Assignee: SILK WAY SERVICES INC.

( * ) Notice: Subject to any disclaimer, the term of this patent is extended or adjusted under 35 U.S.C. 154(b) by 47 days.

This patent is subject to a terminal disclaimer.

(21) Appl. No.: 18/490,375

(22) Filed: Oct. 19, 2023

(65) Prior Publication Data

US 2024/0041008 A1 Feb. 8, 2024

Related U.S. Application Data

(63) Continuation of application No. 17/954,266, filed on Sep. 27, 2022, now Pat. No. 11,839,198.

(60) Provisional application No. 63/248,974, filed on Sep. 27, 2021.

(51) Int. Cl.
*A01K 29/00* (2006.01)
*A01K 11/00* (2006.01)

(52) U.S. Cl.
CPC .......... *A01K 29/005* (2013.01); *A01K 11/004* (2013.01); *A01K 11/006* (2013.01)

(58) Field of Classification Search
CPC .. A01K 29/005; A01K 11/004; A01K 11/006; G01K 13/20; G01K 1/024; G01K 1/08

USPC ........................................................ 340/573.1
See application file for complete search history.

(56) References Cited

U.S. PATENT DOCUMENTS

| | | | | |
|---|---|---|---|---|
| 2018/0192618 | A1* | 7/2018 | Samad | A01K 11/006 |
| 2019/0138801 | A1* | 5/2019 | Psota | G06T 7/73 |
| 2019/0335715 | A1* | 11/2019 | Hicks | H04L 9/0637 |
| 2020/0359605 | A1* | 11/2020 | Maher | A01K 27/009 |
| 2021/0169341 | A1* | 6/2021 | Geissler | A01K 11/006 |
| 2021/0289746 | A1* | 9/2021 | Villalobos | A01K 5/02 |
| 2022/0039357 | A1* | 2/2022 | Roth | G06N 20/00 |
| 2022/0061765 | A1* | 3/2022 | Nichol | A61B 5/01 |
| 2022/0330522 | A1* | 10/2022 | Wang | A01K 29/005 |

* cited by examiner

*Primary Examiner* — Omar Casillashernandez

(57) ABSTRACT

A system and method of livestock management comprising a device disposed in a livestock animal. The device comprises a network interface, a housing defining a cavity, a weighted element, a power supply, a data processing unit, a temperature sensor and an accelerometer. The temperature sensor acquires temperature data of the livestock animal. The accelerometer acquires movement data of the livestock animal. The cavity includes a data processing system having at least one processor and memory. The data processing system is coupled with the power source and communicatively coupled with the temperature sensor and the accelerometer. The data processing system transmits, via the network interface, temperature data and movement data. The cavity includes an activation receiver to receive activation signal to activate the data processing system. A livestock management server receives and analyzes the data, along with any data from any additional data sources, and provides output to a user interface.

12 Claims, 16 Drawing Sheets

SYSTEMS AND METHODS OF LIVESTOCK MANAGEMENT

CROSS REFERENCE TO RELATED APPLICATIONS

This application is a US continuation application of U.S. application Ser. No. 17/954,266, entitled "SYSTEMS AND METHODS OF LIVESTOCK MANAGEMENT" filed on Sep. 27, 2022. This application also claims priority to and the benefit of U.S. Provisional Patent Application Ser. No. 63/248,974, entitled "SYSTEMS AND METHODS OF LIVESTOCK MANAGEMENT" filed on Sep. 27, 2021, the disclosure of which are incorporated herein by reference in its entirety.

BACKGROUND

It is difficult to manage livestock animals such as cattle, horses, sheep, goats and pig. Livestock tags, collars, and leg-bands that attach to animal ears have been used, but they can be large and do not fit onto younger animals such as calves. Furthermore, the identification tags can be moved among the animals to fake the history of the animals. Users manually enter the tags into a system to link the tag to an animal, which can make it difficult to utilize an animal identification solution.

There is a desire to provide advanced means to track livestock animals with reduced risk of tampering, and further, to obtain, monitor and track information about each livestock animal.

SUMMARY

At least one aspect is directed to a device to dispose within a livestock animal. The device can include a network interface. The device can include a housing that defines a cavity. The cavity can include disposed therein an identification tag. The cavity can include disposed therein a weighted element disposed at a first end of the cavity. The cavity can include disposed therein a power source comprising a capacitor and a battery. The cavity can include disposed therein a temperature sensor coupled with the power source. The temperature sensor can acquire temperature data of the livestock animal. The cavity can include disposed therein an accelerometer coupled with the power source. The accelerometer can acquire movement data of the livestock animal. The cavity can include disposed therein a data processing system having at least one processor and memory. The data processing system can be coupled with the power source and communicatively coupled with the temperature sensor and the accelerometer. The data processing system can transmit, via the network interface, the temperature data and the movement data. The cavity can include disposed therein an activation receiver to receive an activation signal to activate the data processing system.

The activation receiver including a magnet. The memory can store the temperature data and the movement data. The data processing system can acquire the temperature data and the movement data responsive to the activation signal. The housing can include a machine-readable optical label such as a QR code. The capacitor can have a capacitance of at least 1 Farad. The housing can have a weight between 50 and 500 grams. The housing can include polyethylene or polypropylene. The housing can include a width of 20 mm and a length of 70 mm. The device can be disposed in a gastrointestinal tract of the livestock animal.

At least one aspect is directed to a device to manage livestock. The device can include a data processing system having one or more processors coupled with memory. The data processing system can receive, from an activation receiver, an activation signal to activate the one or more processors. The data processing system can transmit, responsive to the activation signal, via a network interface, to a livestock management server, a connection request to establish a connection with the livestock management server. The data processing system can receive, from a temperature sensor of the device, temperature data of a livestock animal. The data processing system can receive, from an accelerometer of the device, movement data of the livestock animal. The data processing system can store, in the memory of the data processing system, the temperature data and the movement data. The data processing system can transmit, via the network interface using the connection with the livestock management server, at a predetermined time interval, the temperature data and the movement data.

The data processing system can receive, from the livestock management server, an acknowledgment of transmitting the temperature data and the movement data. The data processing system can identify an error subsequent to transmitting the temperature data and the movement data. The data processing system can receive, from the temperature sensor of the device, additional temperature data of the livestock animal. The data processing system can receive, from the accelerometer of the device, additional movement data of the livestock animal. The data processing system can transmit, responsive to the activation signal, via the network interface, to the livestock management server, a second connection request to establish a second connection with the livestock management server. The data processing system can transmit, via the network interface using the second connection with the livestock management server, at the predetermined time interval, the temperature data, the movement data, the additional temperature data, and the additional movement data. The data processing system can receive, at a first predetermined time interval, the temperature data from the temperature sensor. The data processing system can receive, at the first predetermined time interval, the movement data from the accelerometer. The data processing system can store the temperature data and the movement data in the memory. The data processing system can generate, at a second predetermined time interval, a data packet including the temperature data and the movement data stored in the memory. The data processing system can transmit the data packet including the temperature data and the movement data.

At least one aspect is directed to a system to monitor livestock animals. The system can include a herd database to maintain livestock animal information of one or more livestock animals in a herd. The system can include a data processing system having at least one processor coupled with memory. The data processing system can receive, from a livestock management device disposed within a livestock animal, a connection request, the connection request including an identifier of the livestock management device. The data processing system can identify, from the identifier of the livestock management device, the livestock animal corresponding to the livestock management device. The data processing system can receive, from the livestock management device, temperature data and movement data of the livestock animal. The data processing system can generate a comparison between the livestock animal information maintained by the herd database and the temperature data and movement data of the livestock animal. The data processing system can identify, based on the comparison, estimated characteristics of the livestock animal. The data processing system can transmit the estimated characteristics of the livestock animal to a user interface. The data processing system can receive, from the user interface, an identification of the characteristic of the livestock animal. The data processing system can modify the analysis based on the identification.

The data processing system can receive a data packet including the temperature data and movement data of the livestock animal. The identifier can be a QR code or some other machine-readable optical code.

At least one aspect is directed to a method of managing a livestock animal. The method can include scanning an identifier of a device, the device comprising a housing that defines a cavity. The cavity can include disposed therein an identification tag. The cavity can include disposed therein a weighted element disposed at a first end of the cavity. The cavity can include disposed therein a power source comprising a capacitor and a battery. The cavity can include disposed therein a temperature sensor coupled with the power source, the temperature sensor to acquire temperature data of the livestock animal. The cavity can include disposed therein an accelerometer coupled with the power source. The accelerometer can acquire movement data of the livestock animal. The cavity can include disposed therein a data processing system having at least one processor and memory. The data processing system can be coupled with the power source and communicatively coupled with the temperature sensor and the accelerometer. The data processing system can transmit, via the network interface, the temperature data and the movement data. The cavity can include disposed therein an activation receiver to receive an activation signal to activate the one or more processor. The method can include applying, using a magnetic field, the activation signal to activate the device. The method can include introducing the activated device into a gastrointestinal tract of the livestock animal. The method can include receiving, in a user interface, an estimated characteristic of the livestock animal. The method can include providing, via the user interface, a confirmed characteristic of the livestock animal.

At least one aspect is directed to a method to monitor livestock animals. The method can include maintaining, by a data processing system having at least one processor coupled with memory, a herd database including livestock animal information of one or more livestock animals in a herd. The method can include receiving, by the data processing system, from a livestock management device disposed within a livestock animal, a connection request, the connection request including an identifier of the livestock management device. The method can include identifying, by the data processing system, from the identifier of the livestock management device, the livestock animal corresponding to the livestock management device. The method can include receiving, by the data processing system, from the livestock management device, temperature data and movement data of the livestock animal. The method can include generating, by the data processing system, a comparison between the livestock animal information maintained by the herd database and the temperature data and movement data of the livestock animal. The method can include generating, by the data processing system, an analysis of the comparison to identify estimated or predicted characteristics of the livestock animal. The method can include transmitting the estimated or predicted characteristics of the livestock animal to a user interface. The method can include receiving, by the data processing system, from the user interface, a confirmed characteristic of the livestock animal determined through other systems or algorithms, for instance by directly measuring the amount of feed consumed by the livestock animal. The method can include modifying, by the data processing system, the information maintained by the herd database based on the confirmed characteristic.

BRIEF DESCRIPTION OF THE DRAWINGS

Objects, aspects, features, and advantages disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating principles and concepts. The drawings are not intended to limit the scope of the claims included herewith.

DETAILED DESCRIPTION

The present disclosure overcomes previous challenges by providing systems and methods of livestock management. Provided is a device with sensors for monitoring health and characteristic of livestock animals. The device can be sized to be small enough to be ingested by the livestock animals but large enough to be retained within the animal. The device can include epoxy that covers all the components inside the bolus to make it durable (e.g., such as if bitten by the livestock animal). The device (e.g., bolus) can monitor the livestock animals (e.g., cows or calves) for a long time, such as 9 years. The device can include a battery and a super-capacitor to extend the lifetime of the device. An operator (e.g., farmer) can scan an identifier (e.g., QR code or some other machine-readable optical label) located on the body of the device to read it with a scanner (e.g., mobile phone camera or application-specific device) to link the device with a livestock animal identifier before having the livestock animal ingest the device. Therefore, the operator can easily initialize monitoring the livestock animal without requiring technicians or invasive procedures on the livestock animal.

The device can include a thermometer and accelerometer and other sensors, from which the device can acquire measurements at pre-set intervals. A microprocessor in the bolus can use machine-learning (ML) algorithms to extract valuable summary of the data from the accelerometer. Once processed into a smaller size, suitable for transition via low-power wide-area network protocol protocols (e.g., LoRa), the device can send the data to a nearby gateway, which connects to our cloud-computing platform via Internet (e.g., Wi-Fi at a farm). By transmitting the data at predetermined intervals, the device can reduce power consumption. By optimizing the power consumption, the device can have improved battery life to the extent that the device can provide data from within the livestock animal for years.

On the server (e.g., livestock management server, one or more servers, cloud platform), ML algorithms can generate a profile and establish a range of normal parameters for each animal. If the data from a device shows deviation from the early established norms of this animal, a notification (e.g., alert) can be sent to the operator's personal device (e.g., cellphone) or user interface (e.g., web interface or portal). The farmer can provide feedback about the notification and the condition of the livestock animal. This feedback can be used by the server to train the ML algorithms to improve the accuracy of monitoring. Therefore, the system can incorporate the feedback and animal assessment protocols to continuously train the ML algorithms to improve the accuracy and relevance of the alerts regarding the livestock animals.

Figure 1:
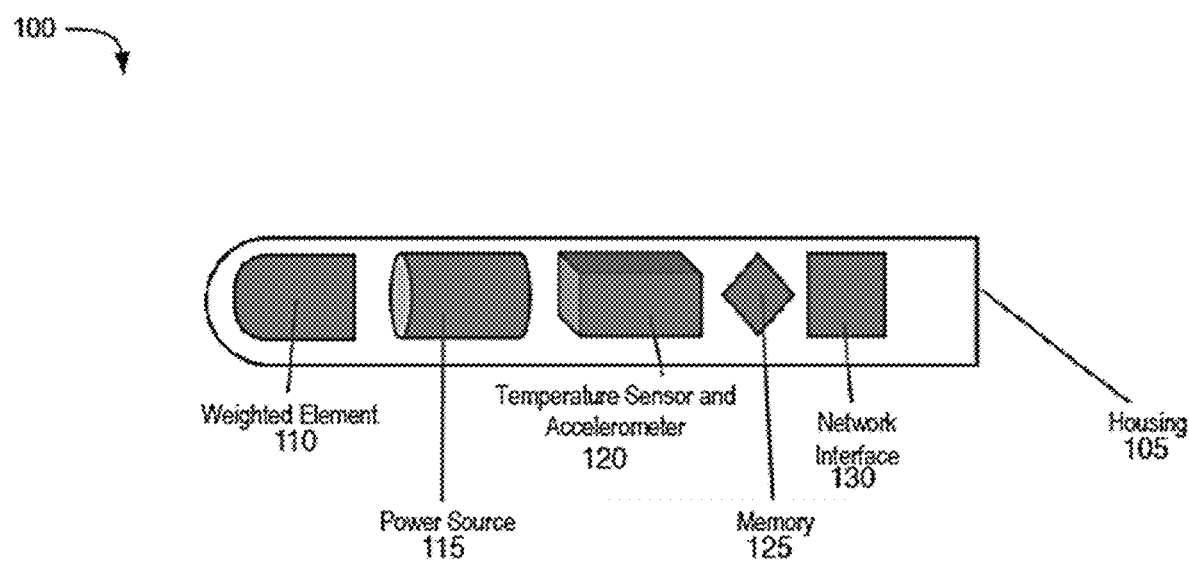
FIG. 1 is a depiction of an embodiment of a device to dispose within a livestock animal.

FIG. 1 depicts a device 100 for monitoring livestock animals. The device 100 can acquire health, characteristic, behavior, and identification parameters of the livestock animal. A livestock animal can ingest the device 100. The device 100 can be waterproof and durable to resist physical impact. For example, the device 100 can remain functional after being dropped from a 2 meter height on the concrete floor. The device 100 can include a weight to keep the device 100 at the bottom of the stomach of the livestock animal.

The device 100 can include a housing 105. The housing 105 can house the components of the device 100. The housing 105 can have the shape of a capsule or a bullet. The housing 105 can be made out of plastic, high-density polyethylene (HPDE) or some other biocompatible material. The housing 105 can be filled with epoxy. The HPDE can have a density between 0.83 to 1.07 g/cm$^3$. For example, the housing 105 can house the battery 115 so that it stays inside the housing 105 and does not leak into the livestock animal. Even if the housing enclosure breaks or cracks, the housing 105 itself can remain solid to keep the components stable and operational.

The housing 105 can have a width of 20 mm and a length of 70 mm. The width can be from 15 mm to 30 mm. The length can be greater than 70 mm, such as 80, 90, 100, 110, 120, 130, 140, 150, 160, 170, 180, 190, or 200 mm. A short length, such as 70 mm, allows for the bolus to be administered to calves at birth, and to be administered to smaller animals such as sheep or goats. The housing 105 can include an identifier. The identifier can be an RFID tag or a Radio ID.

The housing 105 can include a weighted element 110. The weight of the weighted element 110 can be between 50 and 500 grams. The weight of the weighted element 110 can be 75 grams. The weighted element 110 can be disposed at a tip of the device 100. For example, the weighted element 110 can be disposed at a tip of the device 100 or the bottom of the device 100.

The housing 105 can include a unique identifier. The unique identifier can be disposed on the housing. The unique identifier can be a machine-acquirable identifier such as a QR code or other machine-readable optical label, a near-field-readable radio-frequency tag such as RFID, or some other easily machine-acquirable identifier. An operator can scan the identifier to identify the device 100.

Figure 2:
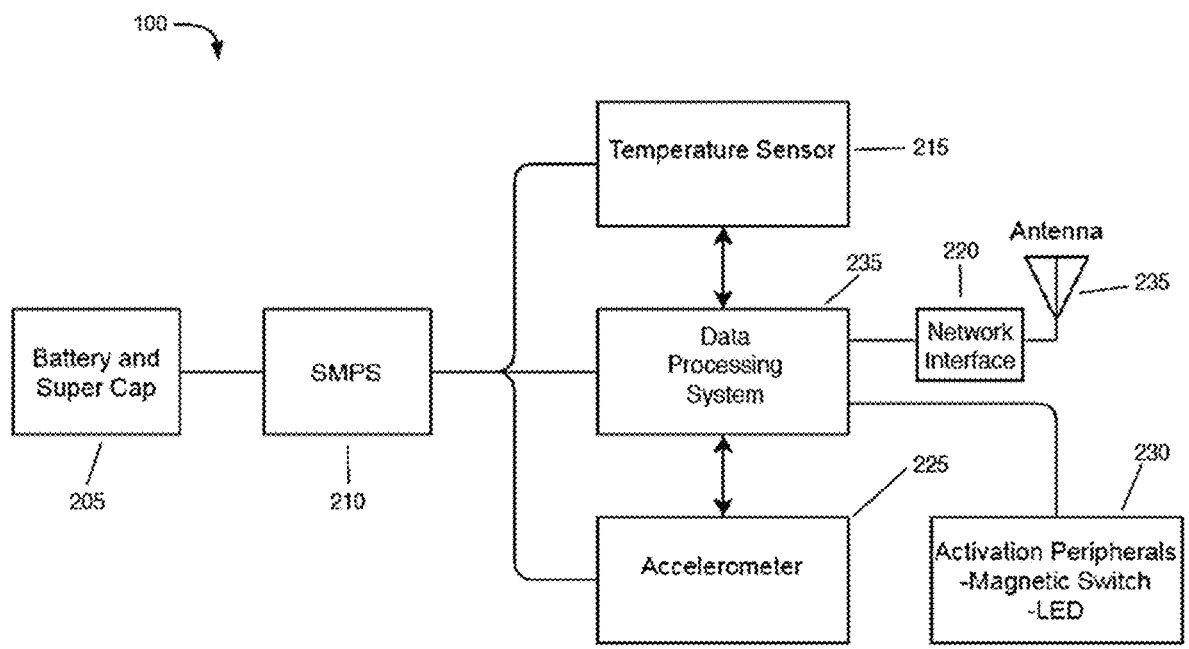
FIG. 2 is a logical diagram of an embodiment of a device to dispose within a livestock animal.

Referring to FIG. 2, among others, the housing 105 can include a power source 205. The power source 205 can be a battery. The battery can be designed for long-term applications. The battery can be a 1.65 Ah non-rechargeable Lithium-thionyl-chloride battery, or a rechargeable battery. The battery can provide power to the device 100 for years, such as 4, 5, or 9 years. The shelf time of the non-activated device can be at least 2 years. The power source 205 can include a capacitor. The capacitor can include a capacitance. The capacitance can be more than 1 Farad, such as 10 to 100 Farads.

The housing 105 can optionally include a switch mode power supply (SMPS) 210 connected to the power source 205. If the SMPS 210 is not present, the battery and/or capacitor 205 may connect directly to the data processing system 235.

The housing 105 can include a temperature sensor 215. The temperature sensor 215 can be a pre-calibrated high-accuracy digital temperature sensor integrated circuit having a 16-bit resolution with an accuracy of 0.1 C and a communication protocol of I2C. The temperature sensor 215 can measure temperatures in the range from +0 to +50 C. The temperature sensor 215 can include an accuracy ±0.1° C. The temperature sensor 215 can be coupled with the power source 205 or the power supply 210.

The housing can include an accelerometer 225. The accelerometer 225 can measure accelerometer data. The accelerometer 225 can be an ultra-small, triaxial, low-g high performance acceleration sensor with digital interfaces in a wearable device configuration. The accelerometer's 225 range can be 4 g. The measurement rate can be 1.56 Hz. The resolution can be 16-bit per axis. The communication can be via I2C. For example, the accelerometer 225 can generate movement data. The movement data can be indicative of movements of the livestock animal. The accelerometer 225 can be coupled with the power source. When enabled, the accelerometer 225 can perform a 3-axis measurement (e.g., 1 frame) at the measurement rate. The accelerometer 225 can store the measurement in an internal memory (e.g., FIFO buffer). This data processing system can remain in sleep mode while measurements are taken until the memory is filled. When the memory is full, an interrupt can trigger the microcontroller to wake-up at a predetermined memory level, which can equal a predetermined number of frames. This corresponds to a wake-up at routine intervals that can be beneficial for data collection. The interrupt can cause the microcontroller to read the memory from the accelerometer and reset the memory.

The device 100 can include a network interface 220. The network interface 220 can comprise an antenna 235. The network interface 220 can be a network dongle, such as a Wi-Fi, LoRa, or RFID. For example, the interface 220 can be a low power, wide area (LPWA) adapter to operate on LPWA networks. The network interface 220 can have a transmission range of at least 25 meters or 350 meters from inside the livestock animal in which the device 100 is disposed. The operator can test the signal strength of the network interface 220 to measure the reception range. The network interface 220 can be insulated from being affected by the activation signal (e.g., magnetic field) during activation of the device 100.

The housing can include an activation receiver 230 for activating the device 100. Before activation, the device 100 can be a in a standby mode (e.g., deep sleep mode) to conserve battery life. The activation receiver 230 can receive an activation signal. The activation signal can be a magnetic field received from a magnet. The activation receiver 230 includes a magnet. The activation receiver 230 can generate initialization signal or current responsive to the activation signal. The activation receiver 230 can be the network interface or configured to be part of the network interface. Conversely, the network interface 220 can be part of the activation receiver 230. The network interface 220 and the activation receiver 230 can be distinct components.

The housing can include a data processing system 235. The data processing system 235 can have at least one processor and memory. The data processing system 235 can be coupled with the temperature sensor 215. The data processing system 235 can receive temperature data from the temperature sensor 215. The data processing system 235 can be coupled with receive movement data from the accelerometer 225. The data processing system 235 can store the temperature data and the movement data in the memory. The data processing system 235 can be coupled with the network interface 220. The data processing system 235 can be coupled with the power source 205 or with the SMPS 210. The data processing system 235 can be coupled with the activation receiver 230. The data processing system 235 can be activated responsive to the receiving the activation signal. For example, the data processing system 235 can draw power from the SMPS 210 or power source 205 responsive to the activation signal.

The device 100 can utilize temperature and accelerometer sensors to monitor the health of livestock animals (e.g., ruminant animals such as calves and cattle) from within the animal's reticulum or digestive tract. The data processing system 235 can transmit the temperature data and the movement data via the network interface 220 to a livestock management server. The livestock management server can use the temperature data and the movement data to identify characteristics of the livestock animal. For example, the livestock management server can identify that the livestock animal is eating, walking, running, jumping, ruminating, or is sick, stressed or in estrus.

The device 100 can be manufactured to IPC-A-610 Class 2. The assembly can be performed by using ESD controlled procedures. The device 100 can be programmed before the battery and capacitor are installed. The assembly can be performed using surface-mount technology (SMT). Normal SMT processes can be followed to assemble the (Printed Circuit Board Assembly) PCBA.

The device 100 can be programmed by ensuring that the ID range is received from the livestock management serve, or through other means. The antenna may be surface-mounted, through-hole assembled, wired to the PCB, or attached electrically to the PCB in some other way.

Figure 3:
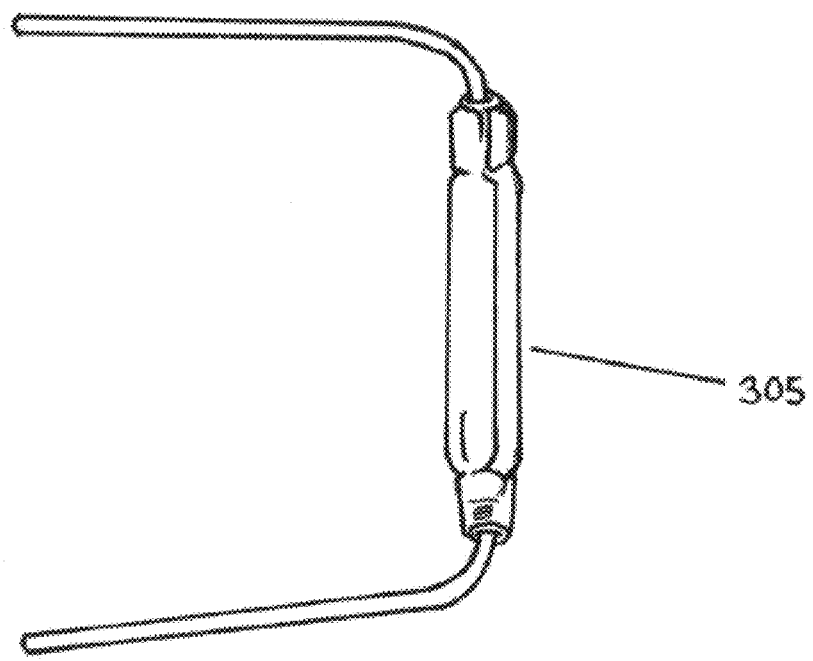
FIG. 3 is a depiction of a reed switch of the device.

FIG. 3 depicts the reed switch 305 of the device 100 which may be used for activation. In other embodiments, other switch types, mountings or configurations may be used, or the device may not use a hardware switch at all. Specifically, a hall sensor may be used in place of a reed switch.

Figure 4:
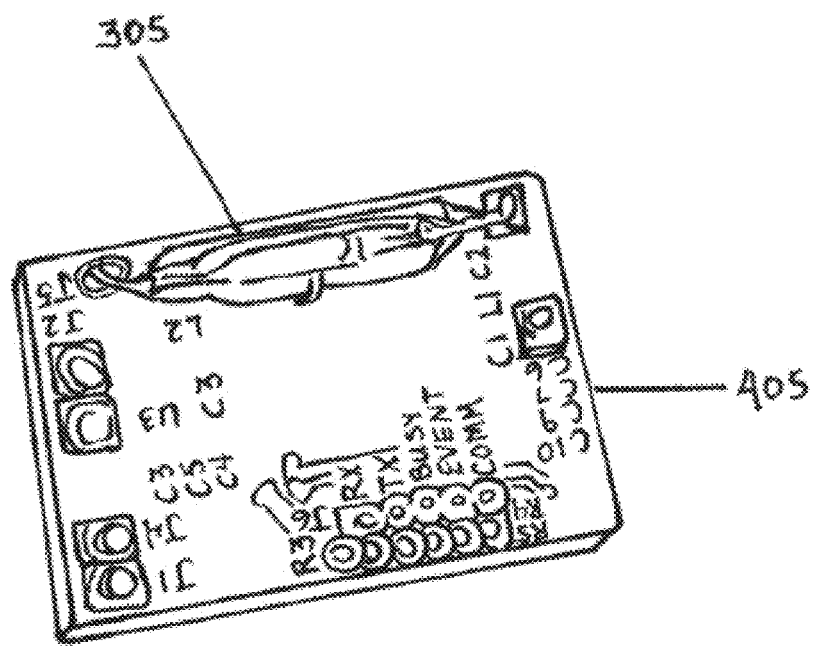
FIG. 4 is a depiction of an assembly of the reed switch of the device.

FIG. 4 depicts the reed switch 305 mounted to the printed circuit board assembly (PCBA) 405 of the device 100.

Figure 5:
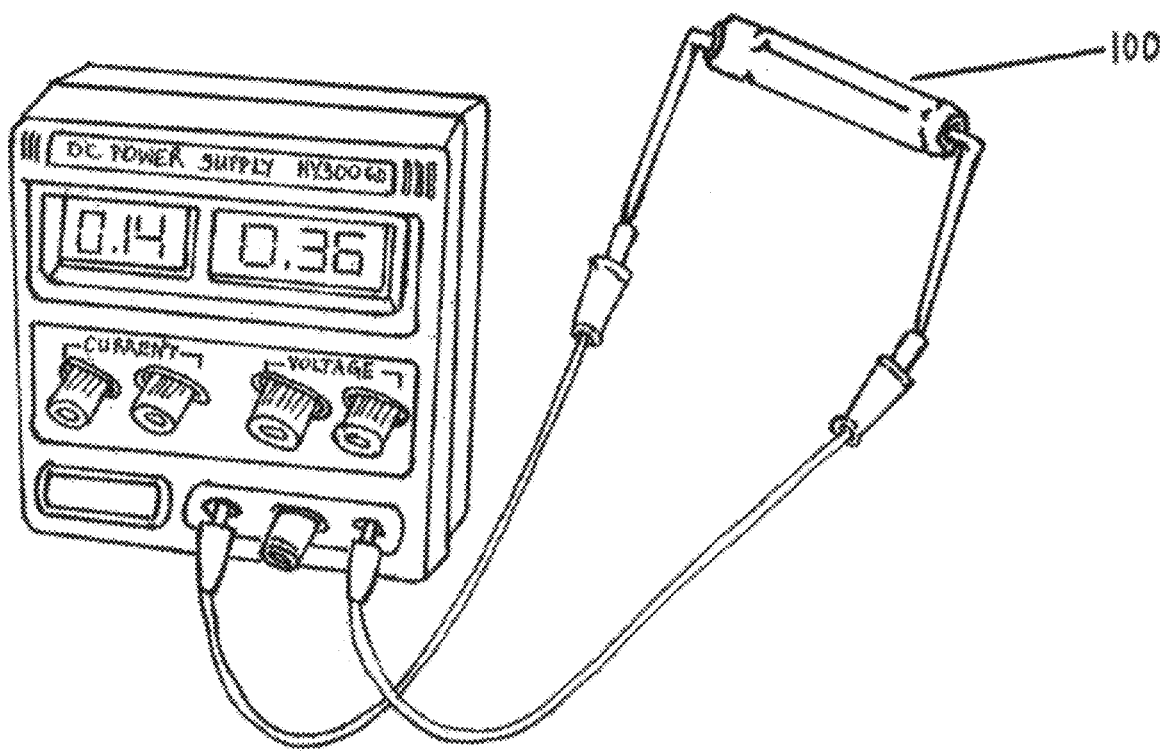
FIG. 5 depicts charging the capacitor of the device.

FIG. 5 depicts charging the capacitor of the device 100. Assembly of the device 100 can include charging the capacitor.

FIGS. 6-9 depict enclosing the electronic components in a housing 105 of the device 100.

Figure 6:
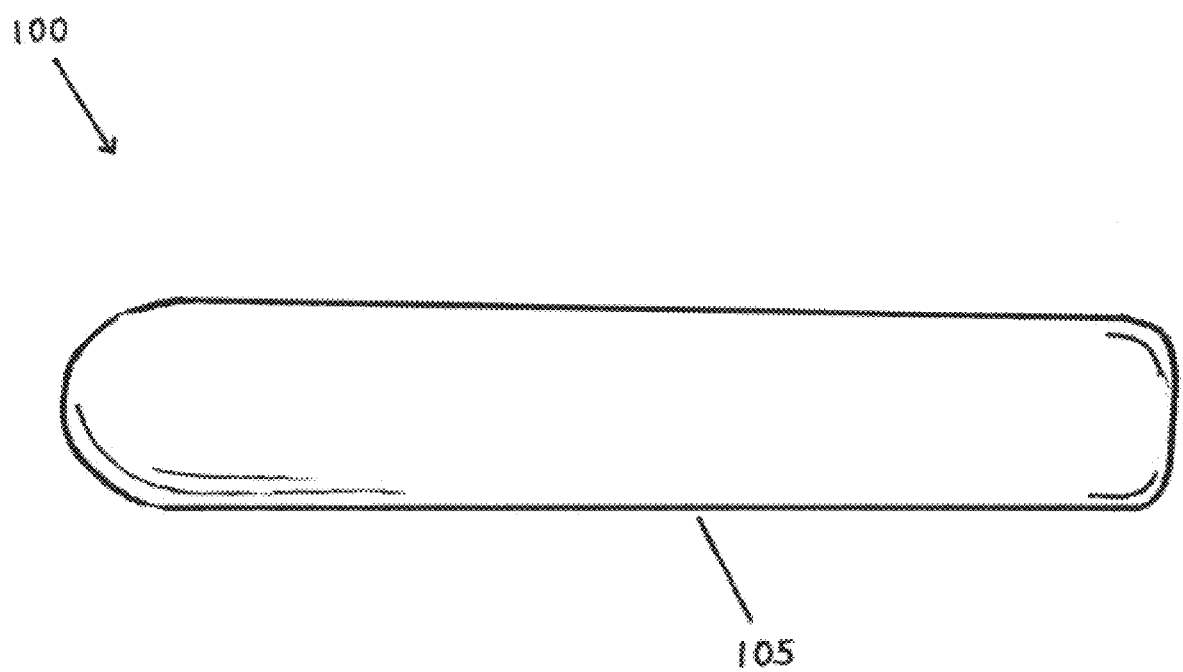
FIG. 6 is a depiction of the housing of an embodiment of the device.

Referring to FIG. 6, among others, shown is the housing 105 (e.g., capsule) of the device 100. The body can be made out of HPDE, polypropylene, or another material which may have similar qualities related to manufacturability or ingestibility. The body can be milk translucent white, black or some other color. The electronic components can be inserted into the body and secured inside by an end cap.

Figure 7:
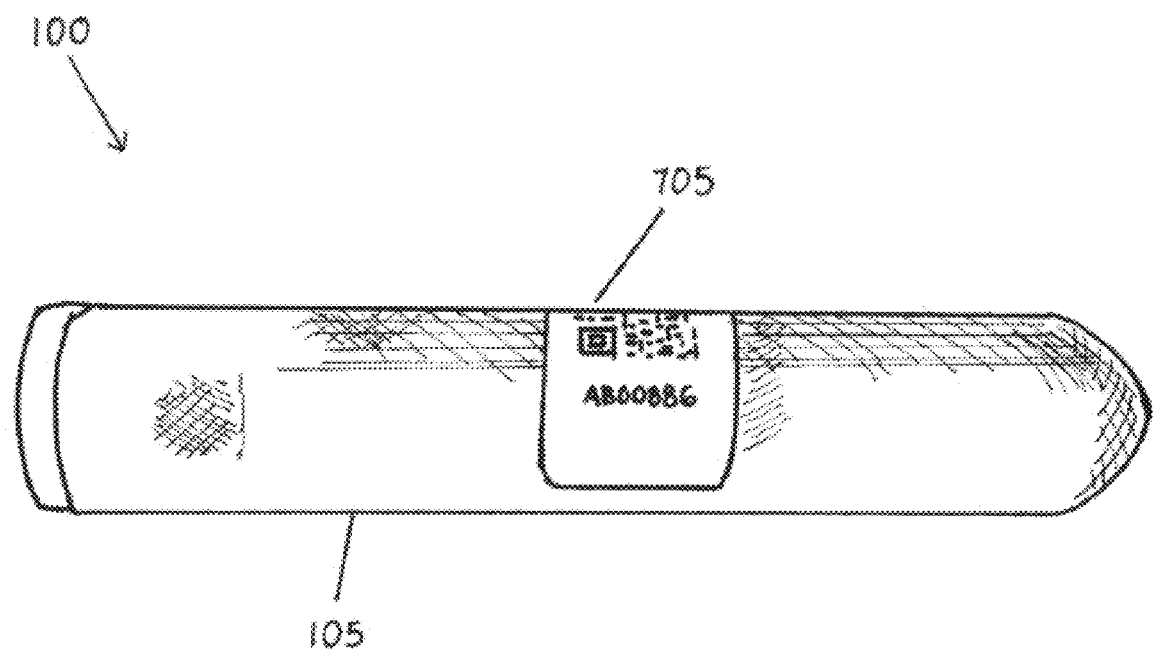
FIG. 7 is a depiction of the housing of an embodiment of the device featuring a machine-readable optical label.

Referring to FIG. 7, among others, the operator can apply a label 705 to the body of the housing 105. For example, the label can be a machine-readable optical label such as a QR code, or a unique identifier. The operator can verify that the unique identifier on the label corresponds to the unique identifier of the PCBA 405. Using an Epoxy gun and static mixer, the operator can add Epoxy (e.g., approximately 1 mL) to the housing to fill the rounded bottom of the housing.

Figure 8:
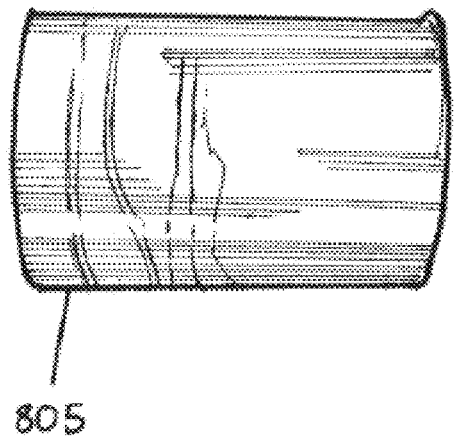
FIG. 8 is a depiction of a weighted element.

Referring to FIG. 8, among others, depicted is a weighted element 805. The weighted element 805 can be a brass cylinder. The operator can insert the weighted element 805 into the housing 105 and push the weight down to the bottom of the housing 105.

Figure 9:
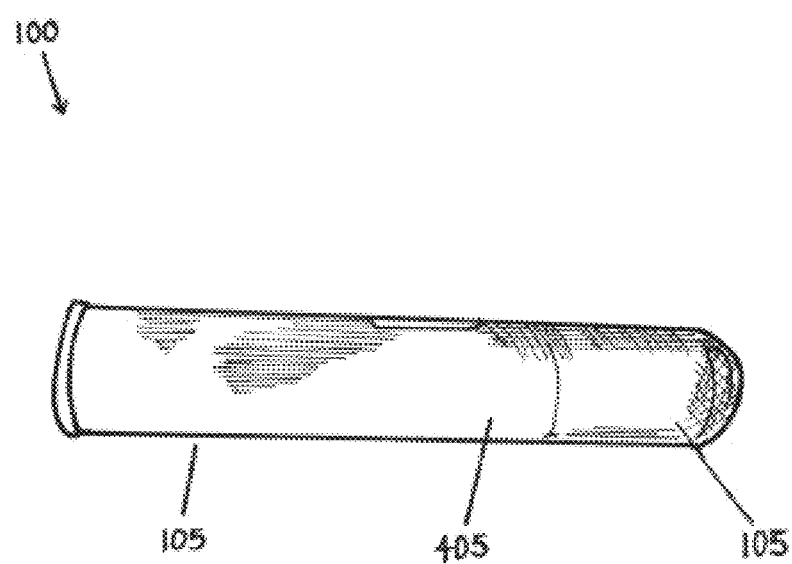
FIG. 9 is a depiction of the assembled housing of an embodiment of the device.

Referring to FIG. 9, among others, the operator can insert the PCBA 405 into the housing 105. The operator can insert the PCBA such that battery is adjacent to the weight 805 and the antenna is adjacent to the open end. The operator can use the epoxy gun and the static mixer to fill the capsule with epoxy to leave enough space (e.g., approximately 2 mm) for an air gap after closing with the lid. In other embodiments, other ways of attaching the lid, such as ultrasonic welding, may be used.

The data processing system 235 can be programmed with firmware. The firmware can include functionality for measuring internal temperature, cattle activity level, and rumination. The firmware can collect the measurements to identify secondary information about the livestock animal such as water intake, feed intake and activity actions such as movement. The firmware can place the device 100 in a deep sleep state (e.g., STM32 STOP mode). Prior to activation, the data processing system can receive the activation signal (e.g., application of the magnet) to wake device 100. The data processing system can transmit a join request responsive to the activation signal. If the join request to the network (e.g., LoRa network, The Things Network, or Chirpstack) is unsuccessful, the device will reboot and re-enter deep sleep.

Once joined successfully, the device 100 can acquire a temperature measurement and initialize accelerometer recording. At every predetermined measurement interval (e.g., 5 minutes, 10 minutes, 15 minutes, or 30 minutes), the data processing system acquires a temperature measurement and accelerometer data. After a predetermined number of intervals (e.g., 2 intervals or 30 minutes), a temperature packet can be sent. Various intervals may be used for acquiring and for sending temperature and accelerometer data.

The device 100 can reset its memory at predetermined intervals, based on time, number of measurements or number of measurement intervals. Upon resetting, additional activation signals are not required for additional data gathering. The device 100 can transmit a join request upon reset. The device 100 can begin recording temperature and accelerations regardless of whether the join request successfully establishes a connection to the livestock management server. If a transmission interval elapses when the device 100 has not successfully connected, the device 100 can transmit the join request instead of the regular data packet. The device 100 does not carry over old data between resets.

The battery life of the device 100 may be extended by collecting data at configurable intervals (e.g., 15 minutes, 30 minutes, or hourly or every 2 hours). The systems and methods described herein can extend the battery life of the device 100 by storing the collected data in a buffer to minimize the frequency of transmissions. For example, the device 100 can transmit the collected data every 6 hours while collecting data in the buffer every 15 minutes.

Figure 10:
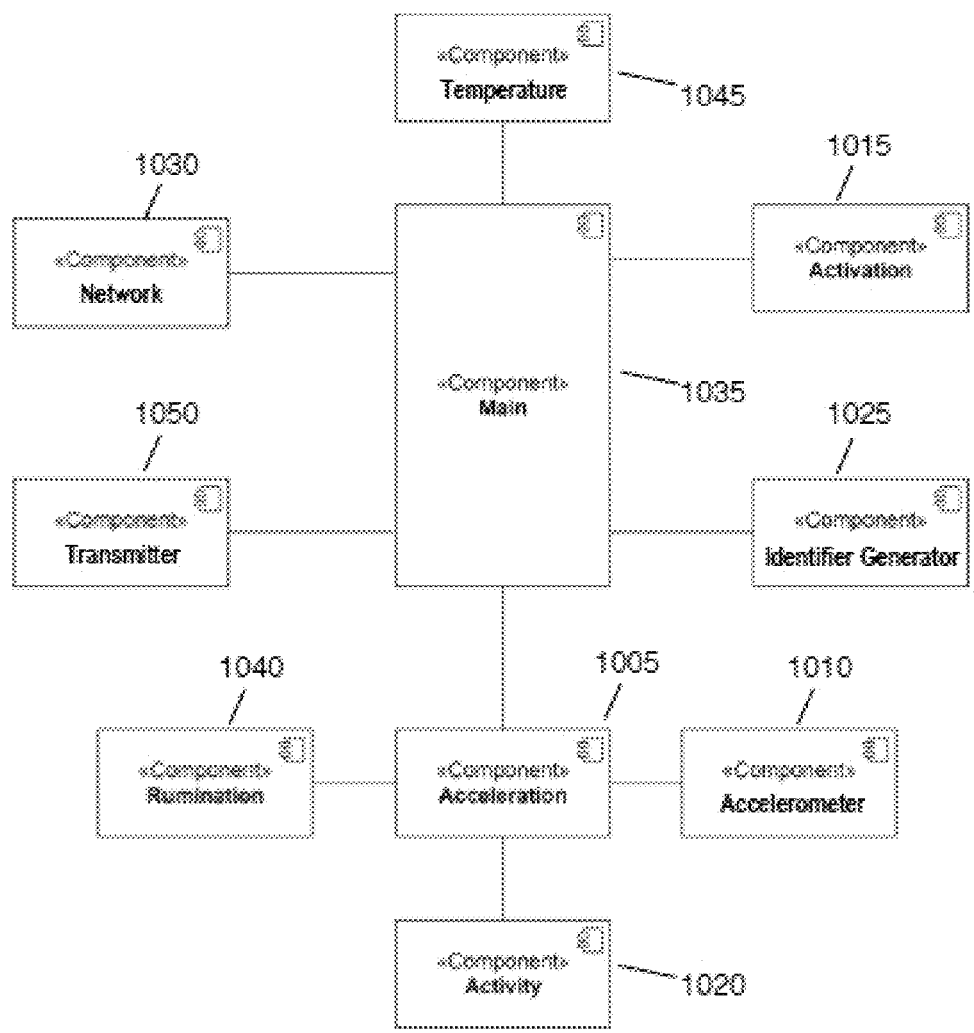
FIG. 10 depicts a firmware component diagram.

FIG. 10 depicts a firmware component diagram of the firmware loaded and running on the data processing system 235.

Figure 11:
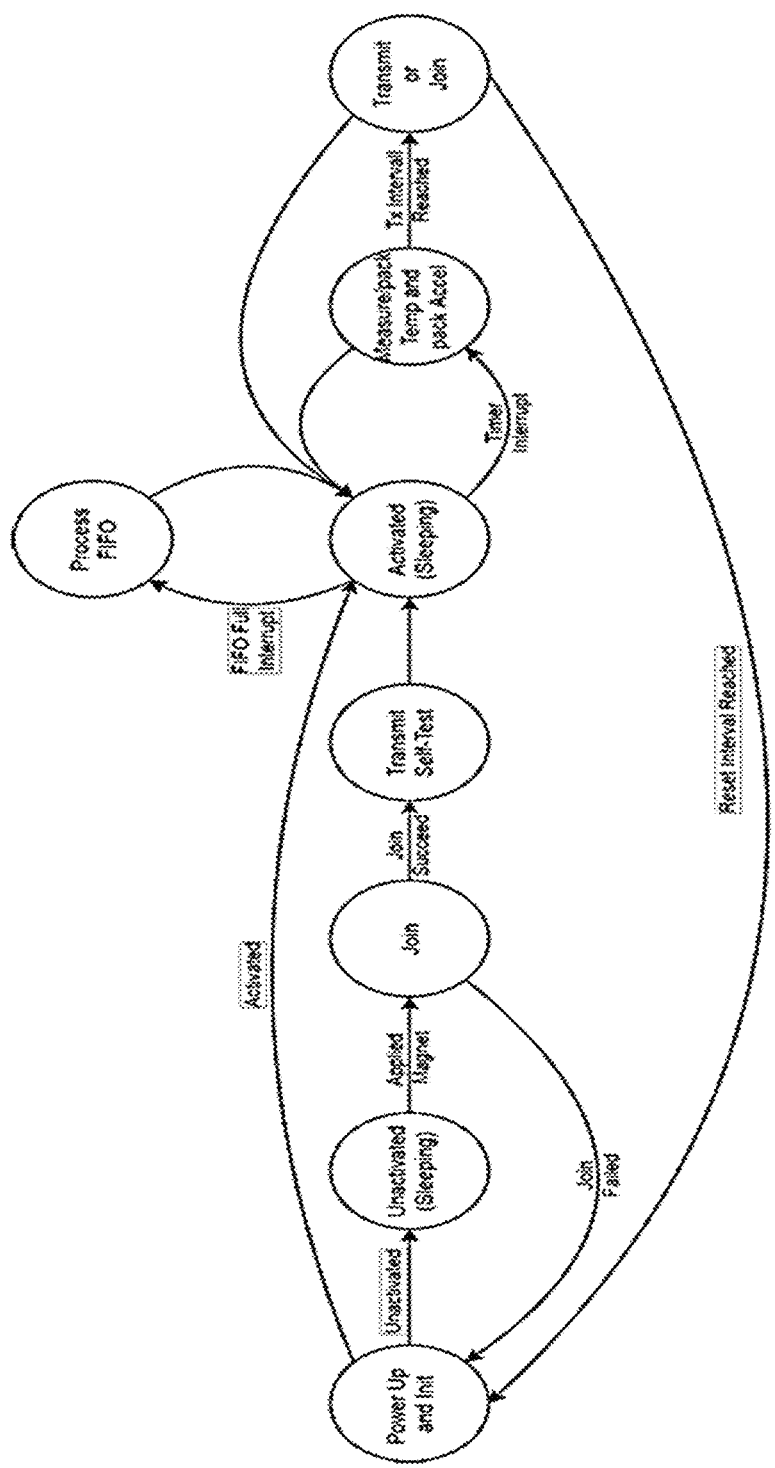
FIG. 11 depicts a firmware state diagram.

FIG. 11 depicts a firmware state diagram of the firmware loaded and running on the data processing system 235.

The acceleration component 1005 can interface with the accelerometer 1010 to handle general acceleration use and features such as initialization of the accelerometer 1010, the callback for when the memory is full, and packing and making rumination and activity data available for the main component.

The activation component 1015 can handle the activation of the device 100. The activation component 1015 can initialize the GPIO hardware to look for interrupts generated by the closure of the magnetically activated reed switch 305 or other activation hardware. The activation component 1015 can put the device to sleep until such interrupt is triggered. The activation component 1015 will not allow sleep unless the device 100 was previously activated. In other embodiments, other activation mechanisms may be used.

The activity component 1020 can provide function for computation of activity metrics based on acceleration data. The activity component 1020 can include helper function for these computations.

The accelerometer component 1010 can include one or more functions for interfacing with the accelerometer 225. The functions can include low-level access of the command interface to the sensor as well as some higher-level functions (e.g., self-test).

The identifier generator component 1025 can provide the interface for writing to non-volatile memory. The device 100 can store several characteristics in non-volatile memory. The identifier generator component 1025 may integrate the generation of the hardware accelerated random number generator. The identifier generator component 1025 can include storage of both the application identifier and the hardware identifier to the EEPROM. The livestock management server can use the application identifier and the hardware identifier to identify the device 100. The data can be stored at predetermined addresses.

Cattle may be uniquely assigned an identification number, such as a Cow ID or other identifier provided by an agency such as the Canadian Livestock Tracking System, the Canadian Cattle Identification Agency, the International Committee for Animal Recording, the National Animal Identification System or some entity to which is delegated this responsibility by an agency. This identification number is unique to the individual livestock animal, and may be centrally generated or administered by an agency or delegated entity. Presently, Cow ID is noted on an ear tag which must be affixed to the livestock animal. It is advantageous not to use an ear tag which must be manually or optically read to hold this unique identifier, but rather to use a bolus such as the device 100 to allow for electronic or automated reading of the Cow ID. The identifier generator component 1025 may store such an externally-provided identifier, such as a Cow ID. The Cow ID may be programmed into an EEPROM, programmed into non-volatile memory, or stored in some other way accessible to the identifier generator component 1025. This programming may be performed at the time that the device 100 is manufactured, at a time when the manufacturer or distributor acquires a Cow ID from an agency or delegated entity, at the time that the device 100 is disposed within the livestock animal, or at some other time. Ideally, the manufacturer of the device 100 receives an allocation of Cow IDs from the agency or delegated entity, selects one Cow ID from the allocation, programs the Cow ID into the device 100, prints a label with an optical code such as a QR code such that the QR code encodes the Cow ID, and affixes the label to the device 100. The operator may then scan the label with the QR code to identify the Cow ID, and once device 100 is disposed within the livestock animal, may directly read out the Cow ID identifier through the network interface 220. While Cow ID is the preferred identifier to use, any centrally administered identifier may be used.

The network component 1030 can include an expansion software pack. This component can cause the network stack to permit and handle all network protocol requirements for transmission and reception. The network component 1030 can include preprocessor directives such as those to configure a geographic (e.g., North American) frequency band. Additionally, the channel mask can be configured to be compatible with the local area network. The sub-components can be modified to use the specified frequency bands and the application identifier to identify the device 100

The main component 1035 can integrate the components into an application. The main component 1035 can include functionality relating to processor peripheral and initialization of the device 100. The main component 1035 can include functionality relating to main loop. The main component 1035 can include functionality relating to activation workflow. The main component 1035 can be configured to self-test the device 100. The main component 1035 can include functionality relating to transmission timers.

The rumination module 1040 can use the accelerometer data to estimate whether rumination is detected in the livestock animal.

The temperature component 1045 can be configured to interface with the temperature sensor. The functionality can include low-level access of the command interface to the sensor for initialization and receipt of temperature measurements.

The transmitter component 1050 can provide two data structures for use in transmitting the sensor data. The transmitter component can provide a circular FIFO.

Upon boot up, the main component can initialize the peripherals (e.g., temperature and accelerometer sensors) of the device 100. Once the system peripherals are initialized, the device 100 can be activated.

Figure 12:
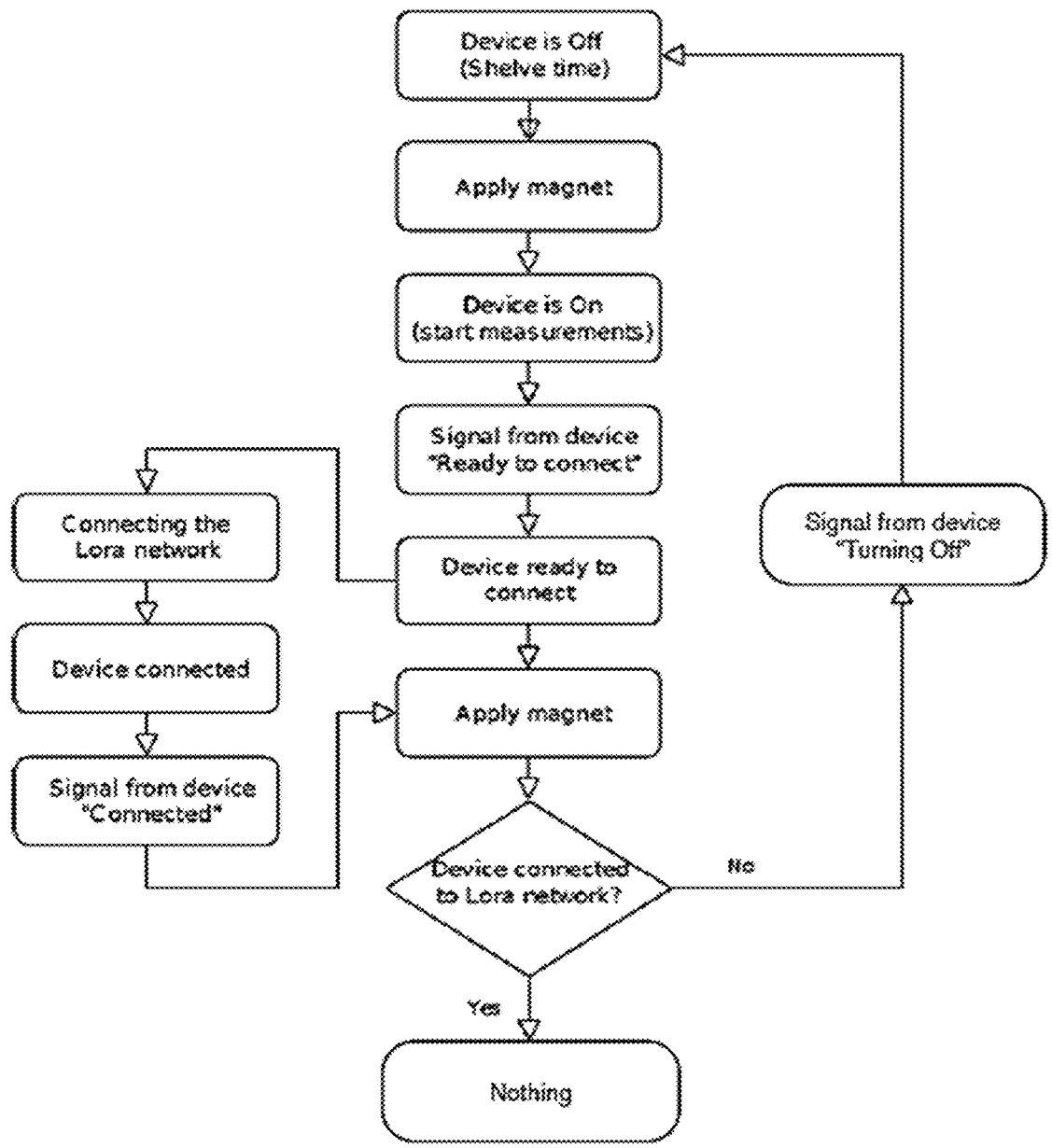
FIGS. 12 and 13 depict flow diagrams of activating the device.
Figure 13:
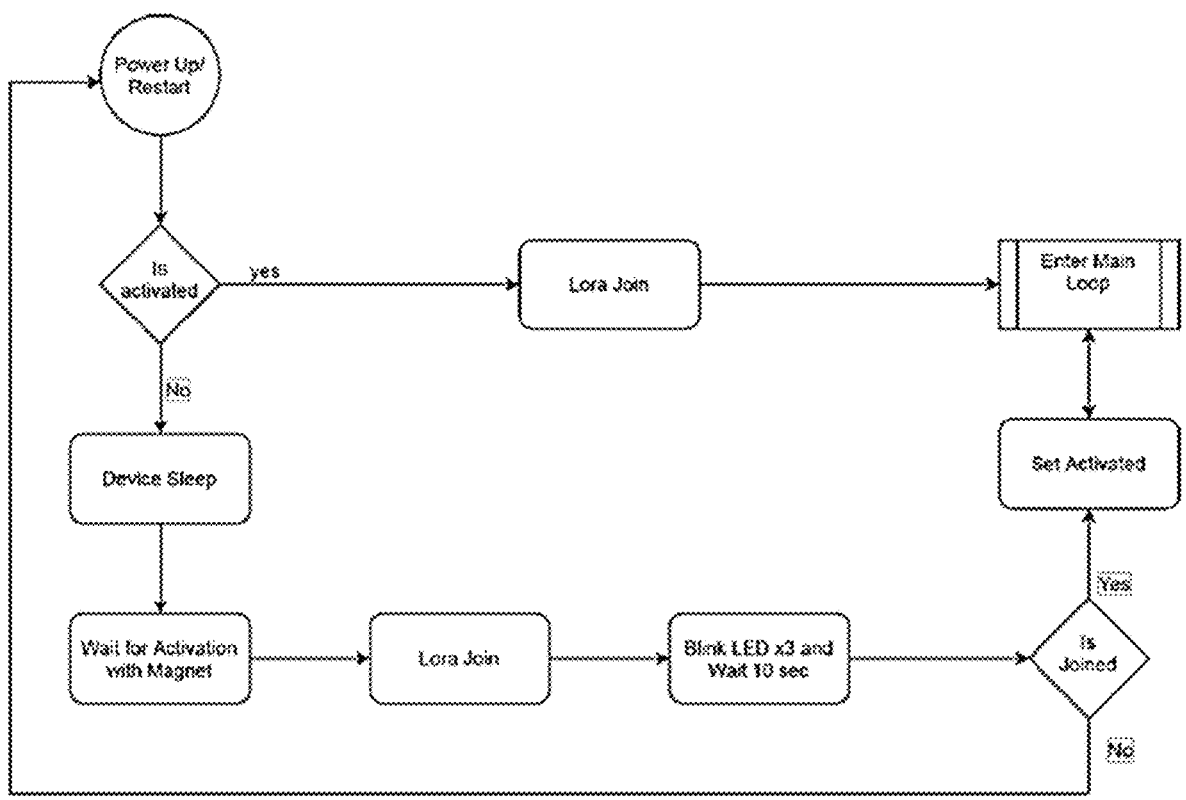

FIGS. 12 and 13, among others, depict activation flow diagrams. Referring to FIG. 12, among others, depicted is an activation flow diagram. The device 100 can include an option to be activated only before the application to the livestock animal. Prior to the activation, all device 100 can be OFF (e.g., no measuring and no accelerometer data). The activation can be done by applying a magnet to a marked place of the device to trigger activation. At the activation, the device 100 can generate an alert (e.g., sound or light), so that the operator can see the device is ON and ready to connect to a network.

Referring to FIG. 13, among others, depicted is the activation workflow. When the device 100 is activated and joined to the local network, the device 100 can send a self-test packet to verify the hardware status. The accelerometer 225 can begin collecting data and the temperature sensor 215 can begin collecting temperature measurements. The measurement timer can be set to a predetermined interval (e.g., 15 minutes). The main loop can be entered and the device 100 can go to sleep.

The data processing system can wake under one or more conditions. The network protocol interrupts may cause the data processing system to wake up. The low-power wide-area network interrupts can cause to processor to process MAC commands and downlinks from the network stack. The measurement timer expired interrupts can cause the data processing system to wake up. The measurement timer interrupts can cause the data processing system to check if a transmission interval has elapsed. If the transmission interval has elapsed, the data processing system can pack and transmit the relevant sensor data. The data processing system can check for the system reset interval. If the interval has elapsed, the data processing system can be reset. The accelerometer memory full interrupts can cause the data processing system to wake up. The memory full interrupt can trigger the accelerometer module callback function. The accelerometer is stopped and the accelerometer memory is cleared whenever the processor is woken up. Such clearing of memory prevents unexpected function in the case where a memory interrupt would interrupt other firmware processing.

Figure 14:
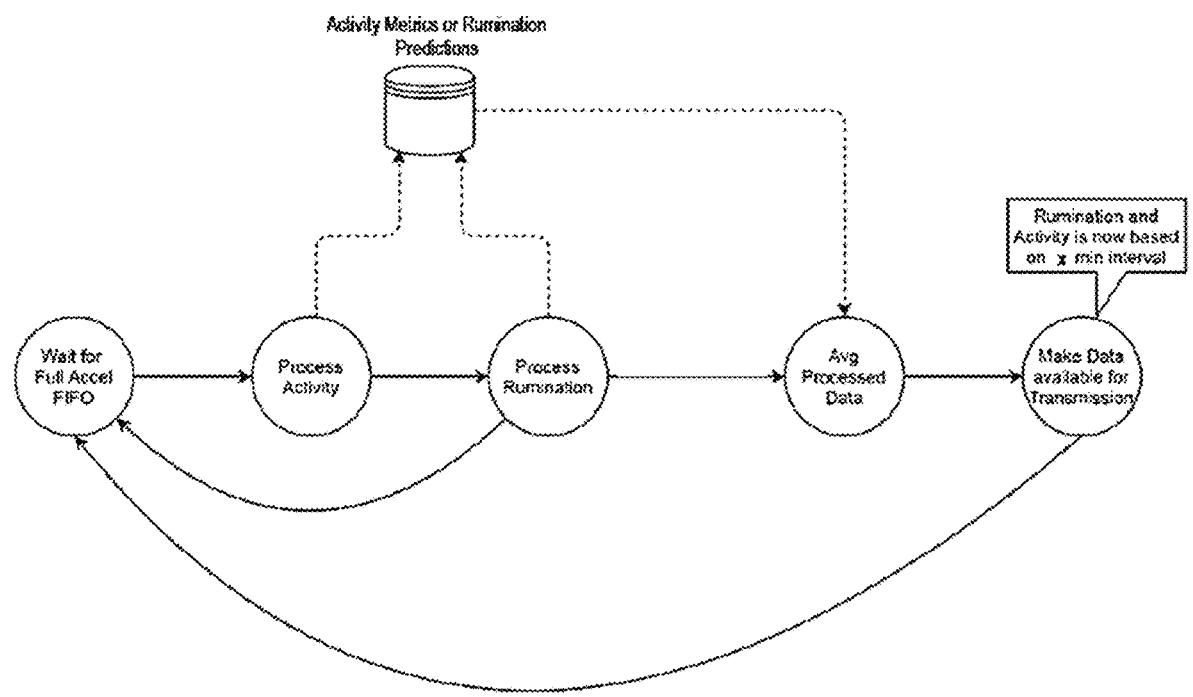
FIG. 14 depicts a flow diagram for sending data from the accelerometer.

FIG. 14 depicts a flow diagram for the accelerometer. Once activated, the device 100 can acquire acceleration data points from the accelerometer. The memory of the accelerometer 225 can store a predetermined number of measurements before needing to be read. When the memory of the accelerometer is full, the accelerometer can send an interrupt to the processor.

This interrupt can wake the processor to begin processing. The full FIFO can be read from the accelerometer and used to calculate an activity metric. The activity metrics are stored, the accelerometer is reset to acquire another measurement, and the data processing system can be put back to sleep.

Figure 15:
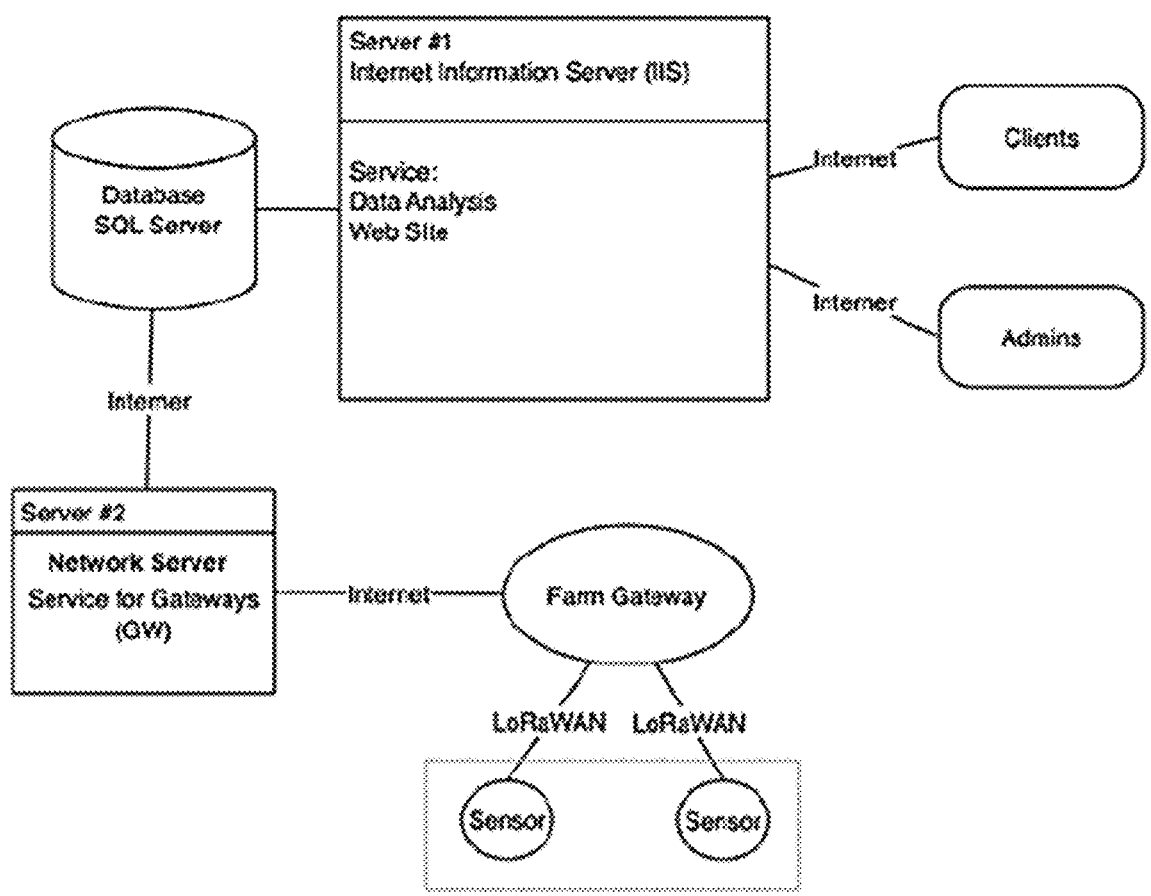
FIG. 15 depicts a network diagram for a livestock management server.

When a predetermined number of memory overflows (e.g., 2, 4, 6, 8, 10 or other number of full FIFOs) have been processed and stored in this way, the device 100 can aggregate them by averaging the activity metrics and voting (e.g., tie goes to rumination) with the rumination states. The aggregate values are representative of a MX window (e.g., 15 minutes) and are made available to be read by other components. Since the time required to fill the memory the predetermined number of times (e.g., 2, 4, 6, 8, or other number of FIFOs) can be slightly less (e.g., 800 sec) then the measurement interval (e.g., 900 sec), the measurements in the interleaving time can be discarded. Other algorithms for estimating the activity state from individual readings may be used, including time-weighted average, taking the most/least recent value, averaging with a required threshold value, or some other algorithm FIG. 15 depicts a network diagram for a livestock management server. The livestock management server can connect to the device 100 via network servers and gateways, such as LoraWAN certified gateways. The livestock management server can receive the transmissions from the device 100 at regular intervals, such as 15, 45, or 60 minutes. The livestock management server can receive the transmissions in the format specified in the payload specification.

Data testing can include the operator activating the device 100 by the application of the magnet to generate the activation signal. The device 100 can confirm the activation. The device 100 can acquire data for 24 hours. The livestock management server can analyze variation in data (e.g. temperature changes, motion) for the sensors of the device 100. The livestock management server can pass the device 100 if the data was received without packet loss for entire duration with sensor data reflecting the environment of the test.

Activation testing can include three unsuccessful activations followed by successful activation with magnet. The activation can be confirmed. The device 100 can acquire data for 24 hours. The livestock management server can analyze variation in data (e.g. temperature changes, motion) for the sensors of the device 100. The livestock management server can pass the device 100 if the data was received without packet loss for entire duration with sensor data reflecting the environment of the test.

Test reports can include identification of the test devices 100. The test report can include a picture of the test setup. The test report can include proof of activation. The test report can include proof of activation. The test report can include all data acquired during the test. The data can be a separate file if filename is provided for report and data to be packaged in compressed archive. The test report can include creating a template.

Post potting test includes setting up the device 100 to ignore activation. The device 100 can be activated with the magnet. The gateway server can receive the join message from the activated device 100. The gateway server can confirm that the join messages were not accepted. The livestock management server can indicate that it is not activated. The livestock management server can be configured to ignore activation.

An advanced post-potting test can include firmware modifications. The livestock management server can be setup to accept activation. The device 100 can be activated with a magnet. The device 100 can transmit data packets and go back to sleep. The livestock management server can verify the data packets. The livestock management server can be configured to ignore the activation.

The device 100 can generate a self-test packet format for testing the device 100. The device 100 can send self-test packets when the device 100 is activated. The packet can include bytes corresponding to temperature, and bytes corresponding to accelerometer health. The device 100 can send the self-test packet via a predetermined port of the network. The device 100 can transmit self-test status codes for testing the accelerometer.

The device 100 can generate a temperature packet in a transmission buffer of the temperature sensor. The temperature sensor of the device 100 can acquire temperature measurements. The measurements can be 16-bit measurement, taken at predetermined intervals and added to a circular transmission FIFO that contains a predetermined number of measurements.

The device 100 can acquire movement data or acceleration activity data points from the accelerometer. The acceleration data can be included in activity packets.

The device 100 can generate an acceleration packet in a transmission buffer of the accelerometer. A transmission buffer can include the acceleration information. The transmission buffer can be similar to the transmission buffer to maintain a circular FIFO and redundancy properties, measurement and transmission intervals (e.g., 15 and 45 minutes respectively) like the temperature packets.

The livestock management server can perform data analysis on the temperature and movement data. Based on the temperature data, the livestock management server can identify a temperature of the livestock animal. Based on the temperature data, the livestock management server can identify a location of the livestock animal. For example, the livestock management server can identify if the livestock animal is leaking based on the livestock animal having fewer digestive movements, abnormal movements, or abnormal locations. In yet another example, the livestock management server can identify, based on the accelerometer data, how often the livestock animal is chewing because the chewing would cause movements identified by the accelerometer. If the livestock animal is active, the livestock management server can identify if the livestock animal is walking normally, staying still, or staggering. The livestock management server can track livestock animal activity patterns to see if the livestock animal is healthy or in heat. The livestock management server can analyze the data to create metrics or perform machine learning on the accelerometer data. For example, the livestock management server can sense water intake based on temperature changes inside the livestock animal's digestive tract. The livestock management server can use the data to generate a calving prediction of when the livestock animal is about to give birth. The livestock management server can use the data to identify eating efficiency of the livestock animal. The livestock management server can use accelerometer data within a time window to provide into a ML algorithm.

In an embodiment, the livestock management server can sense water intake or feed intake based on temperature changes inside the livestock animal's digestive tract. Digestive tract or rumen temperature may change based on a number of factors, including water intake and feed intake.

As the animal drinks water, the rumen temperature drops quickly and returns slowly to its baseline value in a characteristic way. As the animal eats feed, the rumen temperature changes in a characteristic way different from when the animal drinks water. Aspects of this measured change and return in temperature, such as total amount of temperature drop, longevity of the temperature drop, time to return to baseline or time spent at a certain level below baseline, may correlate to a measure of total volume of water consumed by the animal, or to a measure of total mass of feed consumed by the animal. The livestock management server can calculate these statistical measures based on the temperature measurement series, and may therefore estimate the amount of water or feed consumed by the animal in this period of time. The livestock management server may present this information to the user in the form of a report or user interface element, and may log this information on a per-animal basis.

In an embodiment, the livestock management server may use a machine learning (ML) system to estimate the water or feed consumption of a livestock animal. The system may use similar inputs as an algorithmic approach, may recognize characteristic changes in rumen temperature which may correlate with periods of water consumption or feed consumption, and may estimate water or feed consumption based on these inputs.

In an embodiment, the device disposed within the livestock animal may comprise a data processing element which implements a data analysis module in order to provide smoother, more accurate, more timely or better interpreted data. The data analysis module may incorporate statistical analysis algorithms, a machine learning (ML) algorithm or system, or some other data analysis system. The data analysis module may receive data from one or more sensors (e.g. accelerometer, temperature sensor), and may output data in response to each new reading or may accumulate more than one reading before issuing output data. The data analysis module may output data with characteristics corresponding to similar characteristics of its inputs (e.g. receiving raw accelerometer readings and outputting smoothed accelerometer values) or may output data with different characteristics from its inputs (e.g. receiving raw temperature readings and outputting a signal corresponding to an estimate of whether the livestock animal is drinking).

In an embodiment, the livestock management server may receive readings not only from the inside of the livestock animal's digestive tract, but also from one or more temperature or humidity or air quality sensors outside of the animal. Such sensors may be located in the animal's water supply, in the animal's water trough or elsewhere in the water to sense the water temperature, near or in the animal's feed supply, somewhere within or nearby the building housing the animal in order to sense the air humidity or quality, or somewhere within or nearby the building housing the animal in order to sense the air temperature, humidity or quality. The sensors may be located elsewhere for other readings. The livestock management server may improve the accuracy of the water intake estimates by using a water temperature sensor reading or air temperature sensor reading in conjunction with the rumen temperature reading to provide a baseline reading for a heat transfer calculation, or to scale the rumen sensor readings, or to provide one or more additional inputs for a machine learning algorithm which estimates the animal's water intake. Similar systems and methods may be used to improve the accuracy of the feed consumption estimates by using a temperature sensor reading in conjunction with the rumen temperature reading.

Figure 16:
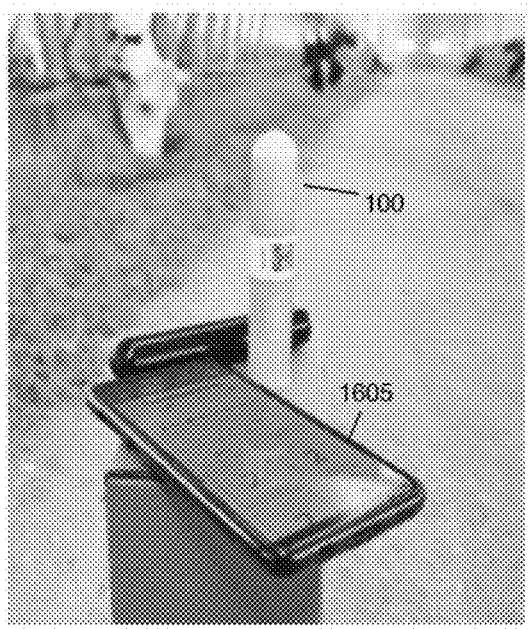
FIGS. 16 and 17 depict user interfaces for displaying livestock animal characteristics.
Figure 17:
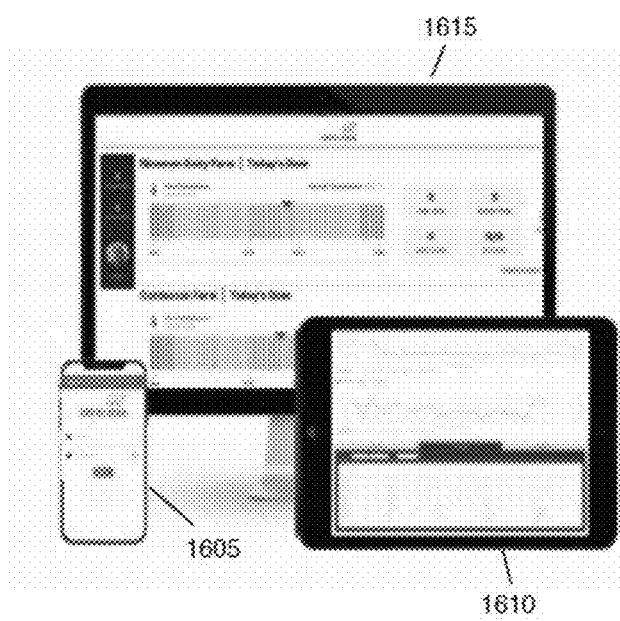

FIGS. 16 and 17 depict user interfaces for displaying livestock animal characteristics (e.g., behaviors, health, location, identification). A user interface for a mobile phone 1605, a user interface for a tablet device 1610 and a user interface for a general-purpose computer (such as a desktop or laptop computer) 1615 are shown. The operator can establish a profile of the livestock animals. The livestock management server can manage a range of normal parameters for each animal. The livestock management server can crowdsource data to identify characteristics of the livestock animals. If the data from a device shows deviation from the early established norms of this animal, a notification (e.g., alert) can be sent to the operator's personal device (e.g., cellphone) or user interface (e.g., web interface or portal). The livestock management server can receive feedback and confirmations from the operators to request assessments to be used by the livestock management server to adjust sensitivity of the estimation and prediction algorithms. The livestock management server can increase precision for a particular livestock animal or a particular farm or region. The farmer can provide feedback about the notification and the condition of the livestock animal. This feedback can be used by the livestock management server to train the ML algorithms to improve the accuracy of monitoring. Therefore, the system can incorporate the feedback and animal assessment protocols to continuously train the ML algorithms to improve the accuracy and relevance of the alerts regarding the livestock animals. For example, if the livestock management server determines that a cow has a fever but the farmer indicates that the cow does not have fever but is simply hyperactive, the livestock management server can refine the data analysis to identify that some cows are hyperactive instead of having a fever. The data of a particular livestock animal or the entire herd can be shared with additional users such as veterinarians.

The livestock management server can apply rumination determination on the received accelerometer data. The livestock management server can apply gradient decision tree or other algorithms to distill the data to a number between zero and 1 to identify a percentage of rumination. The livestock management server can use a machine learning algorithms utilizing the raw data to perform rumination determination on the received data. The livestock management server can use the data to indicate a likelihood that the cow is ruminating during a particular time. The livestock management server can calculate probabilities over time and identify whether the livestock animal is ruminating based on a predetermined threshold (e.g., 30-70% above/below cutoff for rumination). The livestock management server can apply amplitude deviation algorithms on the data.

The livestock management server can determine activities by testing activity metrics and applying statistical measures to the received data. These statistical measures may be calculated on each element of received data, on a sliding window of received data, or on some sampling of the received data.

The livestock management server can determine activities based on ENMO (Euclidian Norm Minus One), MAD (Mean Amplitude Deviation), AI (Activity Index), some other statistical measure related to the received data, or some combination of these. These measures may be used to improve the accuracy of the final output, to reduce noise in the output, to provide results more quickly or with less data, to provide results which are more generalizable, or to otherwise improve the information eventually presented to the operator.

According to the disclosure, a device to dispose within the gastrointestinal tract of a livestock ruminant animal is disclosed. The device comprises a network interface, a housing that defines a cavity, the cavity including disposed therein, an identification tag, a weighted element disposed at a first end of the cavity, a power source comprising a capacitor and a battery, a temperature sensor coupled with the power source, the temperature sensor to acquire temperature data of the livestock animal, an accelerometer coupled with the power source, the accelerometer to acquire movement data of the livestock animal, a data processing system having at least one processor and memory, the data processing system coupled with the power source and communicatively coupled with the temperature sensor and the accelerometer, the memory configured to store the temperature data and the movement data, the data processing system to acquire the temperature data and the movement data responsive to the activation signal, the data processing system to transmit, via the network interface, the temperature data and the movement data, and an activation receiver to receive an activation signal to activate the data processing system.

According to the disclosure, the activation receiver including a magnet. The housing includes a machine-acquirable identifier. The housing comprises a biocompatible material. The housing has a weight between 50 and 500 grams. The housing a width between 15 and 30 mm, and a length between 70 and 120 mm, such that the device may be disposed within the gastrointestinal tract of a newborn ruminating livestock animal. The device further comprises a data processing system to receive from the server, an acknowledgment of transmitting the temperature data and the movement data. The data processing system is configured to store a Cow ID identifier and to transmit the Cow ID identifier via the network interface.

According to the disclosure, the device connection request is a first connection request, wherein the connection is a first connection, and comprising the data processing system to identify an error subsequent to transmitting the temperature data and the movement data, receive, from the temperature sensor of the device, additional temperature data of the livestock animal, receive, from the accelerometer of the device, additional movement data of the livestock animal, transmit, responsive to the activation signal, via the network interface, to the server, a second connection request to establish a second connection with the server and transmit, via the network interface using the second connection with the server, the temperature data, the movement data, the additional temperature data, and the additional movement data.

According to the disclosure, the data processing system is configured to receive temperature data from the temperature sensor, receive movement data from the accelerometer, store the temperature data and the movement data in the memory, generate a first data packet including the temperature data stored in the memory, generate a second data packet including the movement data stored in the memory and transmit the data packets including the temperature data and the movement data.

According to the disclosure, a device to manage livestock is disclosed. The device comprises a data processing system having one or more processors coupled with memory. The data processing system is configured to receive, from an activation receiver, an activation signal to activate the data processing system, transmit, responsive to the activation signal, via a network interface, to a server, a connection request to establish a connection with the server, receive, from a temperature sensor of the device, temperature data of a livestock animal, receive, from an accelerometer of the device, movement data of the livestock animal, store, in the memory of the data processing system, the temperature data and the movement data, transmit, via the network interface using the connection with the server, the temperature data and the movement data.

According to the disclosure, a system to monitor livestock animals is disclosed. the system comprises a herd database to maintain livestock animal information of one or more livestock animals in a herd, a data processing system having at least one processor coupled with memory, the data processing system configured to receive, from a livestock management device disposed within a livestock animal, a connection request, the connection request including an identifier of the livestock management device, identify, from the identifier of the livestock management device, the livestock animal corresponding to the livestock management device, receive, from the livestock management device, temperature data and movement data of the livestock animal, generate a comparison between the livestock animal information maintained by the herd database and the temperature data and movement data of the livestock animal, identify, based on the comparison, estimated or predicted characteristics of the livestock animal, transmit the estimated or predicted characteristics of the livestock animal to a user interface, receive, from the user interface, an identification of the characteristic of the livestock animal and modify the analysis based on the identification. The identifier is a machine-acquirable identifier According to the disclosure, a method of managing livestock animal is disclosed. The method comprising the steps of scanning an identifier of a device, the device comprising a housing that defines a cavity, the cavity including disposed therein, an identification tag, a weighted element disposed at a first end of the cavity, a power source comprising a capacitor and a battery, a temperature sensor coupled with the power source, the temperature sensor to acquire temperature data of the livestock animal, an accelerometer coupled with the power source, the accelerometer to acquire movement data of the livestock animal, a data processing system having at least one processor and memory, the data processing system coupled with the power source and communicatively coupled with the temperature sensor and the accelerometer, the data processing system to transmit, via the network interface, the temperature data and the movement data and an activation receiver to receive an activation signal to activate the data processing system. The method further comprises the steps of applying, using a magnetic field, the activation signal to activate the device, introducing the activated device into a gastrointestinal tract of the livestock animal, receiving, in a user interface, an estimated or predicted characteristic of the livestock animal. The method further comprises the step of via the user interface, providing a confirmed characteristic of the livestock animal.

According to the disclosure, a method to monitor livestock animals is disclosed. The method comprises the steps of maintaining, by a data processing system having at least one processor coupled with memory, a herd database including livestock animal information of one or more livestock animals in a herd, receiving, by the data processing system, from a livestock management device disposed within a livestock animal, a connection request, the connection request including an identifier of the livestock management device, identifying, by the data processing system, from the identifier of the livestock management device, the livestock animal corresponding to the livestock management device, receiving, by the data processing system, from the livestock management device, temperature data and movement data of the livestock animal, generating, by the data processing system, a comparison between the livestock animal information maintained by the herd database and the temperature data and movement data of the livestock animal, generating, by the data processing system, an analysis of the comparison to identify estimated or predicted characteristics of the livestock animal, transmitting the estimated or predicted characteristics of the livestock animal to a user interface, receiving, by the data processing system, from the user interface, a confirmed characteristic of the livestock animal and modifying, by the data processing system, the information maintained by the herd database based on the confirmed characteristics.

According to the disclosure, a system to monitor livestock animals is disclosed. The system comprises a herd database to maintain livestock animal information of one or more livestock animals in a herd, a data processing system having at least one processor coupled with memory, the data processing system to receive, from a livestock management device disposed within a livestock animal, a connection request, the connection request including an identifier of the livestock management device, identify, from the identifier of the livestock management device, the livestock animal corresponding to the livestock management device, receive, from the livestock management device, temperature data of the livestock animal, perform data analysis to detect periods when the livestock animal likely drank water and extract statistical measures from this data, generate an estimate of water consumption by the livestock animal from the extracted statistical measures for at least one period of likely water consumption and transmit the at least one water consumption estimate of the livestock animal to a user interface.

According to the disclosure, the performance of data analysis of the system further comprises analyzing the temperature data received from the livestock management device. The system further comprises the data processing system to receive a reading from a sensor external to the livestock animal; and the performance of data analysis to comprise analyzing the temperature readings from the data received from the livestock management device and the sensor external to the livestock animal. The performance of data analysis further comprises the use of a machine learning system trained to recognize periods of likely water consumption by the livestock animal from temperature data. The system further comprises the data processing system to perform data analysis to detect periods when the livestock animal likely consumed feed and extract statistical measures from this data, generate an estimate of feed consumption by the livestock animal from the extracted statistical measures for at least one period of likely feed consumption and transmit the at least one feed consumption estimate of the livestock animal to a user interface.

According to the disclosure, a method of monitoring livestock animals is disclosed. The method comprises the steps of maintaining, by a data processing system having at least one processor coupled with memory, a herd database including livestock animal information of one or more livestock animals in a herd, receiving, by the data processing system, from a livestock management device disposed within a livestock animal, a connection request, the connection request including an identifier of the livestock management device, identifying, by the data processing system, from the identifier of the livestock management device, the livestock animal corresponding to the livestock management device, receiving, by the data processing system, from the livestock management device, temperature data of the livestock animal, performing, by the data processing system, data analysis to detect periods when the livestock animal likely drank water and extracting statistical measures from this data, generating, by the data processing system, an estimate of water consumption by the livestock animal from the extracted statistical measures for at least one period of likely water consumption, and transmitting the at least one water consumption estimate of the livestock animal to a user interface.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Those skilled in the art may make various changes in the details, materials, and arrangements of the parts that have been described and illustrated herein without departing from the scope of the following claims.

All references, patents and patent applications and publications that are cited or referred to in this application are incorporated in their entirety herein by reference.

What is claimed is:

1. A system to monitor livestock animals, the system comprising:
 a herd database to maintain livestock animal information of one or more livestock animals in a herd;

a data processing system having at least one processor coupled with memory, the data processing system to:
receive, from a livestock management device disposed within a livestock animal, a connection request, the connection request including an identifier of the livestock management device;
identify, from the identifier of the livestock management device, the livestock animal corresponding to the livestock management device;
receive, from the livestock management device, temperature data of the livestock animal;
perform data analysis to detect periods when the livestock animal likely drank water and extract statistical measures from this data;
generate an estimate of water consumption by the livestock animal from the extracted statistical measures for at least one period of likely water consumption;
transmit the at least one water consumption estimate of the livestock animal to a user interface;
wherein the performance of data analysis further comprises the use of a machine learning system trained to recognize periods of likely water consumption by the livestock animal from temperature data.

2. The system of claim 1, the data processing system to receive, from the livestock management device, movement data of the livestock animal.

3. The system of claim 1, the performance of data analysis further configured to analyze the temperature data received from the livestock management device.

4. The system of claim 1, further comprising:
the data processing system to receive a reading from a sensor external to the livestock animal; and
the performance of data analysis to comprise analyzing the temperature readings from the data received from the livestock management device and the sensor external to the livestock animal.

5. The system of claim 1, further comprising:
the data processing system to perform data analysis to detect periods when the livestock animal likely consumed feed and extract statistical measures from this data;
generate an estimate of feed consumption by the livestock animal from the extracted statistical measures for at least one period of likely feed consumption; and
transmit the at least one feed consumption estimate of the livestock animal to a user interface.

6. The system of claim 1 wherein the data processing system is further configured to:
receive, from the livestock management device, movement data of the livestock animal;
perform data analysis to detect at least one time period when the livestock animal likely ruminated and extract statistical measures from this data; and
transmit at least one of the estimate of rumination time period of the livestock animal and extracted statistical measure to a user interface.

7. A method to monitor livestock animals, comprising the steps of:
maintaining, by a data processing system having at least one processor coupled with memory, a herd database including livestock animal information of one or more livestock animals in a herd;
receiving, by the data processing system, from a livestock management device disposed within a livestock animal, a connection request, the connection request including an identifier of the livestock management device;
identifying, by the data processing system, from the identifier of the livestock management device, the livestock animal corresponding to the livestock management device; and
receiving, by the data processing system, from the livestock management device, temperature data of the livestock animal;
performing, by the data processing system, data analysis to detect periods when the livestock animal likely drank water and extracting statistical measures from this data;
generating, by the data processing system, an estimate of water consumption by the livestock animal from the extracted statistical measures for at least one period of likely water consumption; and
transmitting the at least one water consumption estimate of the livestock animal to a user interface;
wherein the performance of data analysis further comprises the use of a machine learning system trained to recognize periods of likely water consumption by the livestock animal from temperature data.

8. The method of claim 7, the performance of data analysis further comprising the step of analyzing the temperature data received from the livestock management device.

9. The method of claim 7, further comprising the steps of:
receiving a reading from a sensor external to the livestock animal at the data processing system; and
analyzing the temperature readings from the data received from the livestock management device and the sensor external to the livestock animal.

10. The method of claim 7, further comprising the steps of:
performing data analysis to detect periods when the livestock animal likely consumed feed and extract statistical measures from this data by the data processing system;
generating an estimate of feed consumption by the livestock animal from the extracted statistical measures for at least one period of likely feed consumption; and
transmitting the at least one feed consumption estimate of the livestock animal to a user interface.

11. The method of claim 7 further comprising the steps of:
receiving, by the data processing system, from the livestock management device, movement data of the livestock animal;
performing, by the data processing system, data analysis to detect at least one time period when the livestock animal likely ruminated and extracting statistical measures from this data; and
transmitting at least one of the estimate of rumination time period of the livestock animal and extracted statistical measure to a user interface.

12. A device to dispose within the gastrointestinal tract of a livestock ruminant animal comprising:
a network interface;
a housing that defines a cavity, the cavity including disposed therein:
an identification tag;
a weighted element disposed within the cavity;
a power source comprising a capacitor and a battery;
a temperature sensor coupled with the power source, the temperature sensor to acquire at least one of temperature data of the livestock animal, temperature data of the feed or temperature of water consumed by the animal;

an accelerometer coupled with the power source, the accelerometer to acquire movement data of the livestock animal; and a data processing system having at least one processor and memory, the data processing system coupled with the power source and communicatively coupled with the temperature sensor and the accelerometer, the memory configured to store the temperature data and the movement data, the data processing system to acquire the temperature data and the movement data responsive to an activation signal, the data processing system to transmit, via the network interface, the temperature data and the movement data;

with the housing weighted and sized such that it may be disposed within the gastrointestinal tract of a newborn ruminating livestock animal, and the power source sized to provide power to the device for multiple years, such that the device is able to remain functional within the animal from shortly after the animal's birth throughout a typical animal's lifespan.

* * * * *